United States Patent [19]

Murakami et al.

[11] Patent Number: 4,869,015

[45] Date of Patent: Sep. 26, 1989

[54] ELECTRIC SHOCK INSECT REPELLER

[75] Inventors: Ryohei Murakami, Ikoma; Jiro Oka, Hirakata, both of Japan

[73] Assignee: Matsushita Electric Industrial Co., Ltd., Kadoma, Japan

[21] Appl. No.: 65,186

[22] Filed: Jun. 22, 1987

Related U.S. Application Data

[63] Continuation of Ser. No. 819,506, filed as PCT JP85/00219 on Apr. 19, 1985, published as WO85/04782 on Nov. 7, 1985, abandoned.

[30] Foreign Application Priority Data

Apr. 23, 1984 [JP] Japan .................. 59-81305

[51] Int. Cl.⁴ .............................................. A01M 19/00
[52] U.S. Cl. .......................................... 43/98; 43/112; 43/121; 43/132.1
[58] Field of Search ............. 43/112, 98, 99, 109, 43/121, 132.1, 119; 256/10; 361/232; 312/312

[56] References Cited

U.S. PATENT DOCUMENTS

| | | | |
|---|---|---|---|
| 233,766 | 10/1880 | Iske | 312/312 |
| 2,584,301 | 2/1952 | Sinclair | 43/107 |
| 2,588,894 | 3/1952 | Taff | 43/112 |
| 4,118,752 | 10/1978 | Iguchi | 256/10 |
| 4,144,668 | 3/1979 | Darncharnjitt | 43/114 |
| 4,165,577 | 8/1979 | Shanahan | 43/112 |
| 4,186,512 | 2/1980 | Berg | 43/112 |
| 4,319,423 | 3/1982 | Judd | 43/121 |

FOREIGN PATENT DOCUMENTS

| | | | |
|---|---|---|---|
| 48-24228 | 7/1973 | Japan . | |
| 54-15877 | 2/1979 | Japan . | |
| 57-8701 | 2/1982 | Japan . | |
| 1604155 | 12/1981 | United Kingdom | 43/98 |

OTHER PUBLICATIONS

Translation of Japanese Trademark Publication 57-8701, "Chip Resistor" by Kato.

Primary Examiner—Nicholas P. Godici
Assistant Examiner—Karen Skillman
Attorney, Agent, or Firm—Cushman, Darby & Cushman

[57] ABSTRACT

The present invention relates to an electric shock insecticide apparatus wherein, on a wall plane (1a) on a periphery of an opening (3) of a storing space (2), at least a pair of electrodes (5a), (5b) to which a voltage is to be applied are disposed, keeping an insulation space (W), and between said storing space (2) and said electrodes (5b), an obstructer which is projected from a plane of said electrodes is provided, and is to certainly prevent the invasion of cockroaches trying to invade the storing space by giving electric shock to the cockroaches.

5 Claims, 7 Drawing Sheets

ELECTRIC SHOCK INSECT REPELLER

This is a continuation of application Ser. No. 819,506, filed as PCT JP85/00219 on Apr. 19, 1985, published as WO85/04782 on Nov. 7, 1985, now abandoned.

TECHNICAL FIELD

This invention relates to an electric shock insecticide apparatus which prevent invasion of sanitarily harmful small-size creeping animal such as cockroach (hereinafter referred to as cockroach) into storing spaces such as kitchen furnitures, wash basin cabinet, various storing cabinets, as well as into living spaces such as living room, bath room and others.

BACKGROUND ART

It is known that, when a voltage is applied between arbitrary two legs of a cockroach, since cockroaches secrete adhesive substance on the underside of tip parts of their legs, they are very sensitive to the electric shock.

The below-described experiment examined, by applying various values of voltages between two legs of cockroaches, what degree of electric shocks they have to those various voltages.

Figure 1:
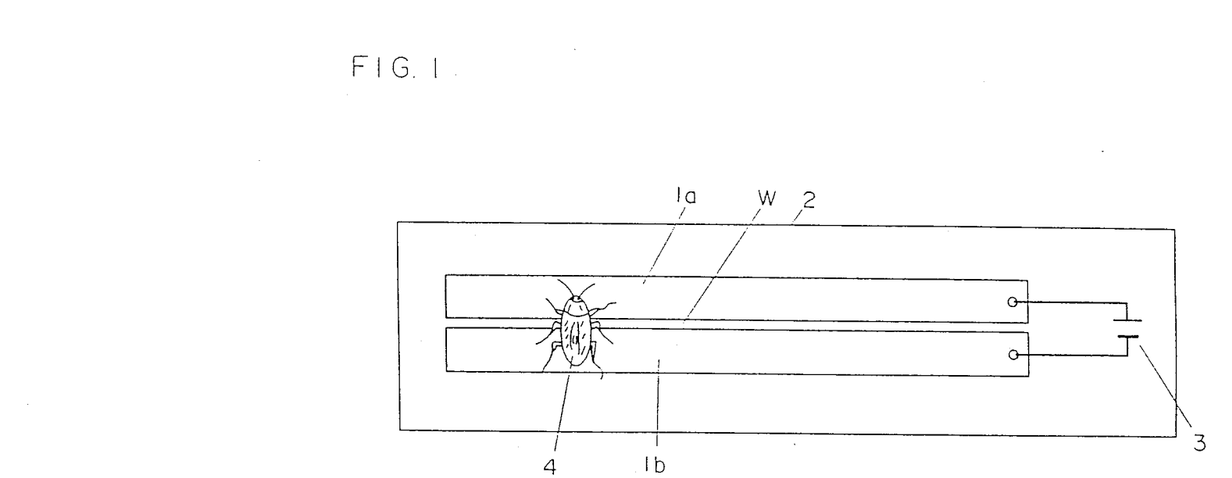
FIG. 1 is a plan view showing an electric shock insecticide apparatus that becomes a premise of the present invention.

In the experimental setup shown in FIG. 1, 1a and 1b are band shaped electrodes made of aluminum plates or the likes, they are disposed in parallel to each other keeping an insulation spacing W on an insulator plate 2. Then, dc voltages are applied by a dry cell 3 between those electrodes 1a and 1b.

Hereupon, letting a cockroach 4 creeping around over the insulator plate 2, when any two legs of the cockroach 4 touch with the electrodes 1a and 1b thereacross, a dc voltage by the dry cell 3 is applied between those two legs of the cockroach 4.

Then, by varying the voltage of the dry cell 3 to various values, degrees of reactions to the electric shock at those various applied voltages were examined and the obtained results are as shown in the following Table 1.

TABLE 1

| voltage | kind | |
|---|---|---|
| | Black cockroach | Brown wing cockroach |
| 4.5 V | no reaction at all | same to the left |
| 6 | jumping by feeling shock | running away by feeling shock |
| 9 | jumping around by feeling strong shock | same to the left |
| 22.5 | appearing momentary cramp | same to the above |
| 30 | appearing faint and turning over | same to the above |

From the above results, it is understood that cockroaches start to feel the electric shock at about 6 volts.

And from measurements of resistances between two legs of these cockroaches, they were found to be about 2 MΩ for black cockroaches while about 1 MΩ for brown wing cockroaches.

From the above-described experiment, since cockroaches start to react at about 6 volts, in current values, it is understood that the electric shock starts at about 3 μA for black cockroach and 6 μA for brown wing cockroach, respectively.

From the above cockroach electric shock test, it was found that the cockroaches sensitively feel the electric shock; in the experiment described below, wherein an experimental setup of FIG. 1 is held in a vertical plane keeping the direction of the electrodes 1 and 2 laterally, when tested cockroaches were set free on an insulation plate 2 at the part below the electrodes 1 and 2, letting them creep crossing the electrodes 1 and 2 upward, it was tested, at various voltages, whether the cockroaches can pass across the electrodes 1 and 2 or not.

In Table 2, the result is shown.

TABLE 2

| voltage | kind | |
|---|---|---|
| | Black cockroach | Brown wing cockroach |
| 9 V | about 50% drop about 50% pass | 100% drop by electric shock |
| 18 V | about 90% drop about 10% pass | 100% drop by electric shock |
| 22.5 V | 100% drop | 100% drop by electric shock |

In this manner, it is possible to let cockroaches fall down by giving them appropriate electric shocks, and therefore, by applying voltages of about 10 volts or higher for brown wing cockroach and about 20 volts or higher for black cockroach on a vertical plane, the movement of cockroaches across the electrodes can be prevented.

After giving the cockroaches experiences of electric shocks several times as described above, soon they become to stop in front of the electrodes and intend to go back in the opposite direction, and finally they never intend to come to the vicinity of the electrodes.

This is because the cockroaches gain a kind of learning effect after they experienced electric shocks several times, and they start to defend themselves when they infer something dangerous in their sights.

This is also understood from the fact that, after their experience of electric shocks, they react other dummy electrode made of the same material but having no voltages at all. Therefore, with this kind of apparatus, besides giving electric shocks, a kind of evasive effect to make cockroaches kept out from the apparatus is also be obtainable.

Figure 2:
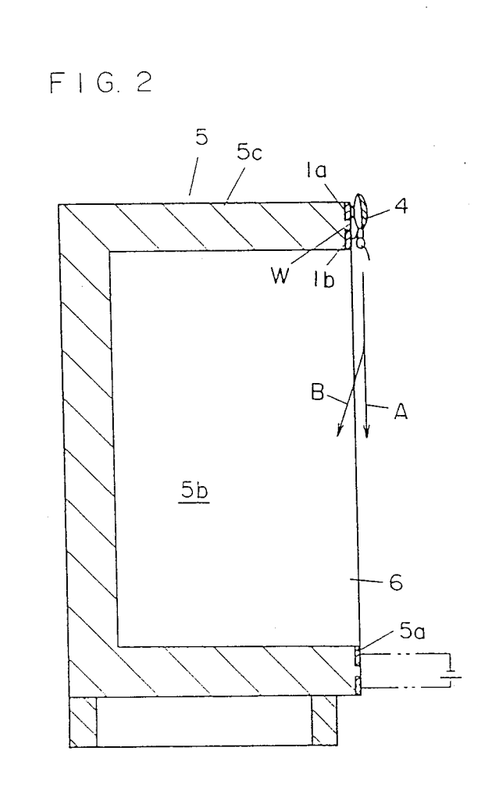
FIG. 2 is a sectional view of the above-mentioned apparatus for explaining a problem arising when this apparatus is installed into a storing cabinet.

Hereupon, by providing the above-mentioned configuration on a wall plane part 5a around an opening part 6 for putting in and putting out things of a storing cabinet 5, invasions of a cockroach 4 into a storing space 5b can be made difficult. That is, the cockroach 4 creeping from the outside plane 5c touches across electrodes 1a, 1b on its creeping way to the storing space 5b, and thereby receiving an electric shock falls down outside the storing space 5b as indicated by an arrow mark A.

However, the cockroach 4 may not only fall down outside the storing space 5b as described above, but it may occasionally fall inside the storing space 5b as indicated by an arrow mark B, and in such a case the cockroach 4 is allowed to enter the storing space 5b. Namely, since the cockroach 4 is of light weight, by the effects of air flows or of the posture of its falling, occasionally it may happen to fall inwards the storing space 5b.

DISCLOSURE OF INVENTION

Therefore, the present invention is to prevent invasion of the cockroach more certainly by providing a rib projecting from a plane of electrodes between the storing space and the electrodes and in the vicinity of those electrodes.

BEST MODE FOR CARRYING OUT THE INVENTION

Figure 3:
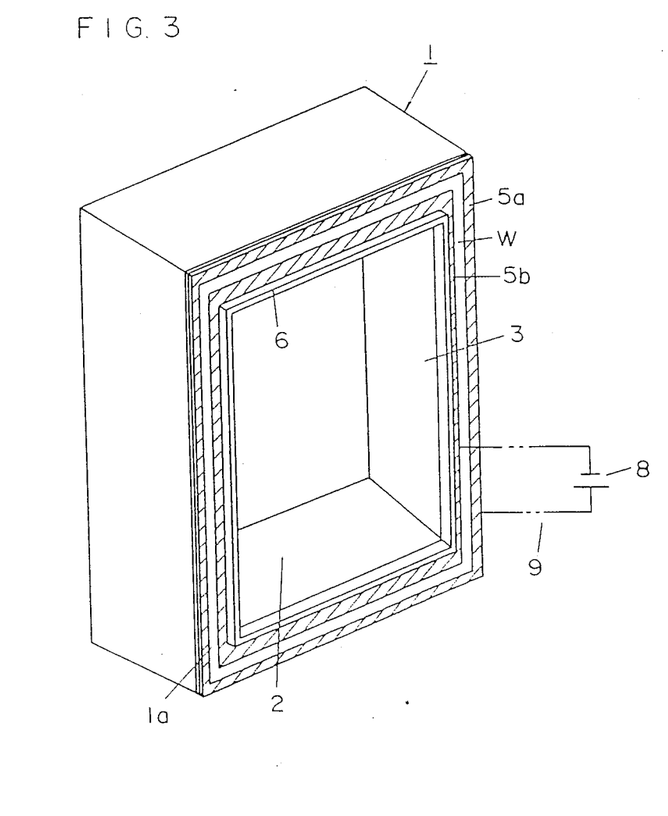
FIG. 3 through FIG. 12 are perspective views and sectional views of principal part showing embodiments of the present invention.
Figure 4:
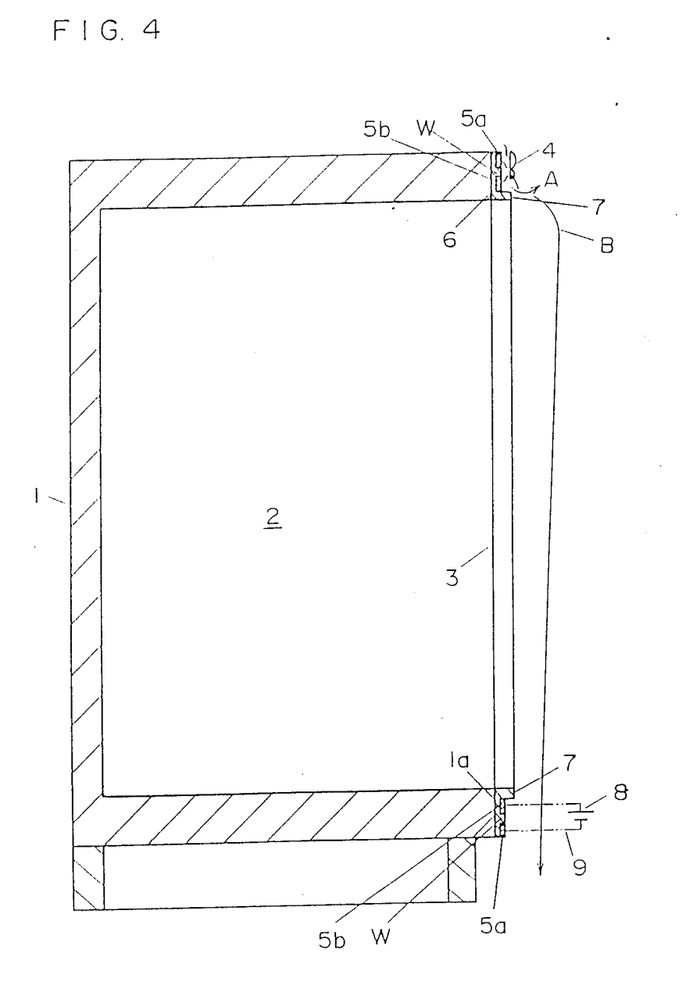

In FIG. 3 and FIG. 4, 1 is a storing body providing a storing space 2 in which tableware, food, or people are accommodated; in this embodiment, although it is shown as a storing cabinet, it may be a kitchen furniture, a wash basin cabinet and others, and further may be a wall body of a building constituting a living space such as a living room or a bath room. 3 is an opening formed on a part of the storing body 1, in a storing cabinet, it is a door part through which stored stuffs are put in and out, and in case of on a wall body of a building, it is a window or a room entrance for people. 5a and 5b are a pair of electrodes made of an electro-conductive material disposed in parallel to each other keeping a small insulation spacing W (about 2 mm) on a wall part 1a on a periphery of the opening 3, and it is made integral with an insulation material 6, so that a part of the insulation material 6 exist in the insulator spacing W between electrodes 5a and 5b and thereby preventing their touching and electric conduction. In the above installation, installation means such as adhesive and tackers are used adequately. 7 is a rib formed, near one of electrode 5b, on the wall part 1a between the storing space 2 and electrodes 5a, 5b, and it is formed with a projection from the plane of the electrode 5b, 8 is a power source for applying a voltage to the electrodes 5a and 5b, and although for which either a commercial power line or a dry cell may be used, in the present embodiment a dry cell is used, and its positive side is connected through electric wires 9 to the one side electrode 5a and its negative side is to the other side electrode 5b, respectively. As for the voltages of the above-mentioned power source 8, a voltage of about 6 volts or highr than that is sufficient for giving electric shocks to a cockroach 4; although much higher voltages may also be used, if it is made as much higher as giving electric shocks to human bodies, the electrodes 5a and 5b can not be disposed at those places where the fear of giving electric shocks to human bodies, and therefore suppressing the voltage less than about 30 volts is most suitable in view of giving sufficiently strong electric shocks to the cockroach 4 while preventing to give electric shocks to human bodies. However, when the electrodes 5a and 5b are installed to those places where no fear of giving electric shocks to human bodies, voltages higher than 100 volts can be used. And, for the case of using the suitable voltage of 30 volts from the commercial power line, a transformer (not shown) can be used for dropping the voltage.

In the constitution described above, as shown in FIG. 4, since a current flows from the power source 8 to the cockroach 4 touching across the electrodes 5a and 5b, the cockroach 4 which feels the electric shock tries to run away the electrodes 5a and 5b, but it is hit with the rib 7 and is bounced therefrom as indicated by an arrow mark A, then falls down as an arrow mark B, hence, it is very seldom to reach the storing space 2. That is, by this bouncing, since the cockroach 4 becomes to fall down in the posture or in the direction more distant from the opening 3, or becomes to fall from a more distant position, even when the air flow is present, it is very seldom to fall down inside the storing space 2.

Figure 5:
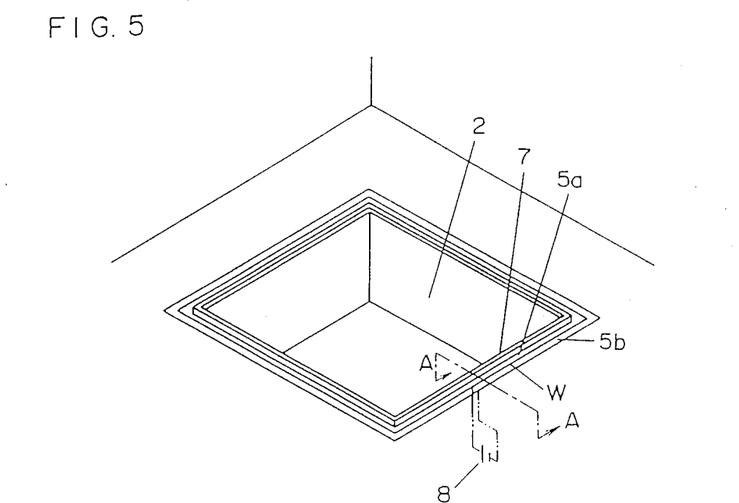
Figure 6:
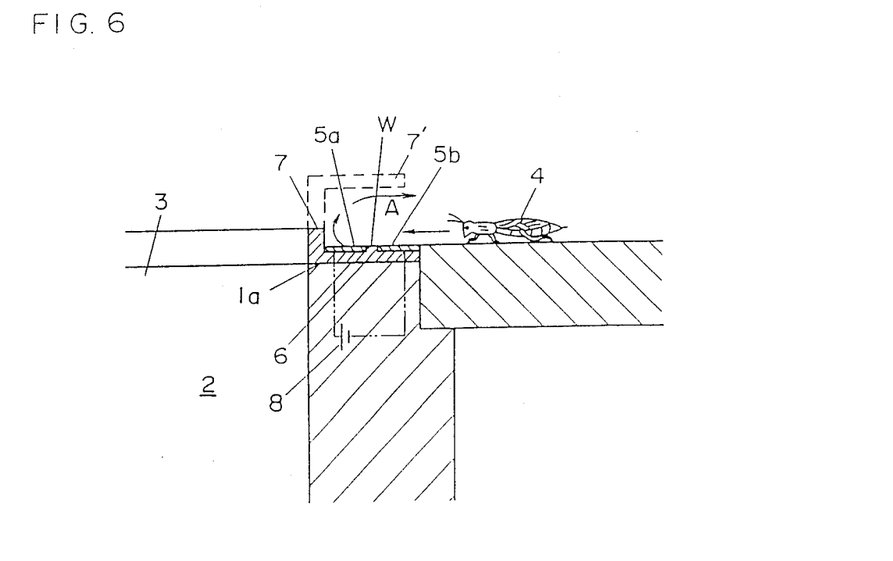

In the above-described embodiment, although an example wherein the electrodes 5a and 5b are disposed in a vertical plane has been explained, those electrodes 5a and 5b may also be disposed in a horizontal plane 1a as is shown in FIG. 5 and FIG. 6. In this example, although the cockroach 4, which feels an electric shock and collides with the rib 7 jumps up and thereafter occasionally falls down inside the storing space 2, normally it is bounced back outside the storing space 2 as an arrow mark A, and hence the invasion of the cockroach 4 into the storing space 2 can be made less.

In the above, since after the cockroach 4 jumps up, it occasionally reaches inside the storing space 2, in order to prevent this, by extending the rib 7 up to the part above the electrodes 5a and 5b as shown by a broken line 7' in FIG. 6, the cockroach 4 collides further with this extended part 7', and thereby the above-mentioned inconvenience hardly happen.

Figure 7:
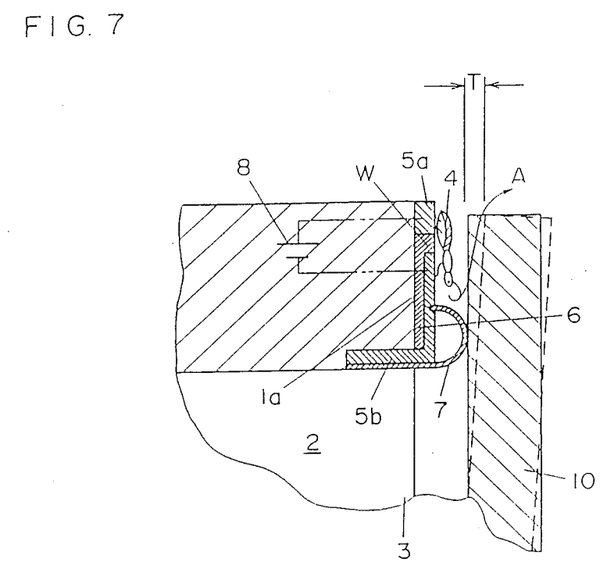

Examples after FIG. 7 show embodiments having a door 10 which opens and shuts the opening 3, and in those examples, even if a gap T arises between a wall plane 1a of a storing body 1 and the door 10 due to a warp of the door 10 or due to an error caused on its production, owing to the disposition of the electrodes 5a and 5b similarly to the above-mentioned example as well as the formation of the rib 7, the invasion of the cockroach 4 into the storing space 2 can be made less. That is, although the cockroach 4 which feels the electric shock and collide with the rib 7 occasionally reaches the storing space 2 through the gap T, mostly it is bounced back as an arrow A shown in the figure and runs away toward outside.

Figure 8:
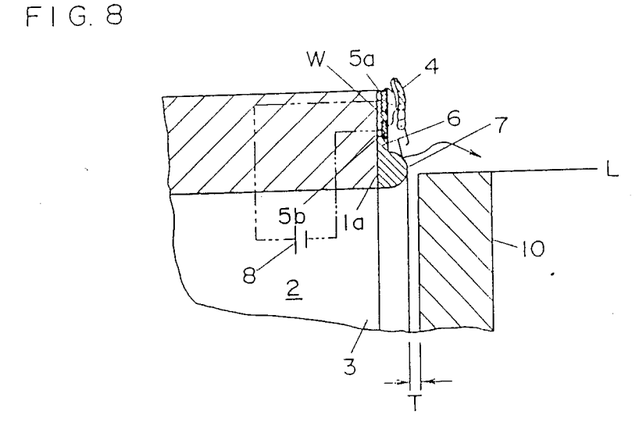
Figure 9:
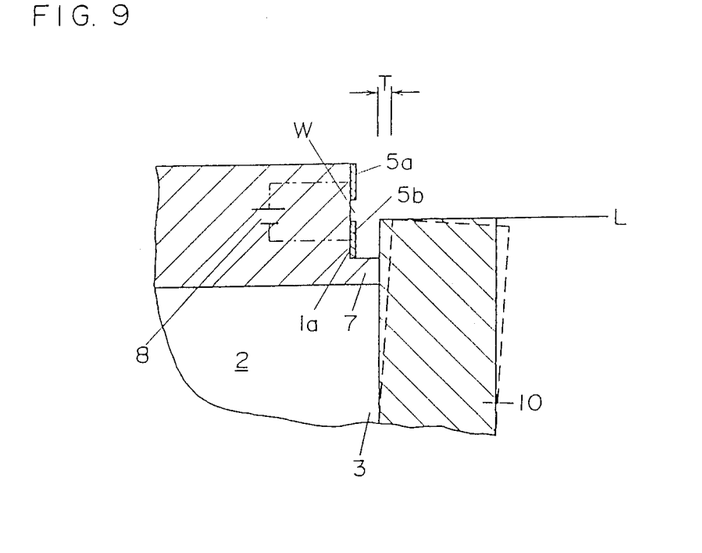
Figure 10:
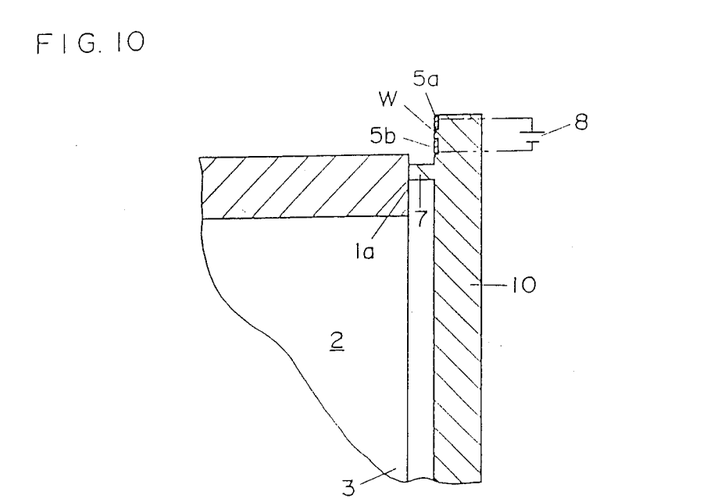
Figure 11:
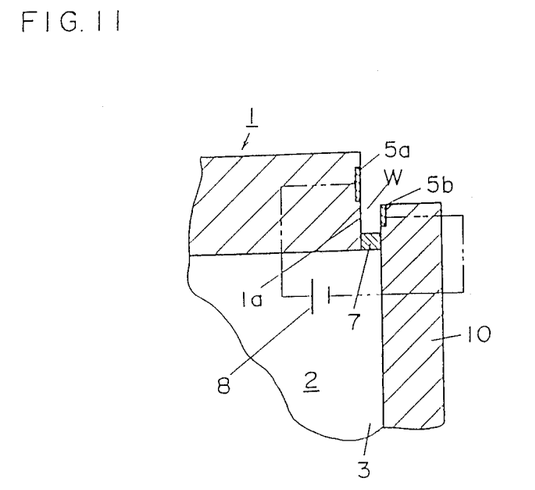
Figure 12:
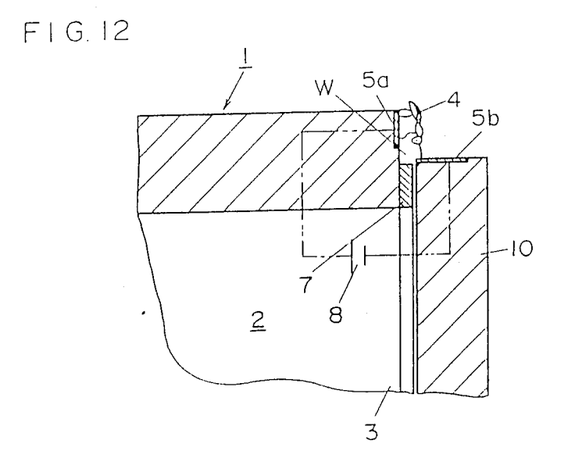

Hereupon, FIG. 7 through FIG. 9 show examples wherein the rib 7 is provided on the storing body, and in these examples, regardless of the open or shut state of the door 10, the invasion of the cockroaches into the storing body 1 can be prevented. And, among these examples, in FIG. 7 and FIG. 8 the rib 7 is formed with a flexible material such as rubber having a buffer effect, and in FIG. 9, the rib 7 is formed by making the wall plane 1a itself project. The reason of making the rib 7 with a flexible material is for the consideration for preventing accidentally happening damages caused by hitting the rib 7 with stuffs to be stored at the occasion of storing those stuffs into the storing space 2. And in the examples shown in FIG. 8 and FIG. 9, by setting the peripheral plane level L close to the level of the rib 7, escapes of the cockroach 4 toward outside is made easier. And, FIG. 10 shows an example wherein the electrodes 5a and 5b as well as the rib 7 are disposed on the door 10; FIG. 11 and FIG. 12 show examples wherein the electrodes 5a and 5b are disposed separately on the storing body 1 and on the door 10 keeping them mutually parallel; and in these examples of FIG. 11 and FIG. 12, the insulator spacing W is formed between each rear plane of the wall plane 1a and of the door 10, respectively, and at a position facing thereto the rib 7 is formed.

INDUSTRIAL APPLICABILITY

As is clear from the explanations given to those embodiments described above, since the electric shock insecticide apparatus of the present invention comprises a constitution having a rib projecting from the electrode plane in the vicinity of those electrodes, after cockroaches feeling the electric shock, they collide with the rib and are mostly bounced back outward, thereby the invasion of cockroaches can be made less.

Besides, although it is sufficient to provide at least a pair of electrodes, if necessary, two pairs or more may be provided.

We claim:

1. A storage device having a storage space and an electric shock insect repeller, comprising, in combination:
    a door for closing and opening an opening of the storage space;
    at least a pair of electrodes to which a voltage is to be applied, said pair of electrodes being mounted on a vertical wall defining a periphery of said opening of said storage space so as to surround said opening of said storage space, said pair of electrodes defining therebetween an insulation space; and
    a rib element disposed adjacent to said electrodes so as to surround said opening inwardly of said electrodes relative to said opening of said storage space and projecting from a plane of said electrodes, said rib abutting said door when said door is closed to form a groove defined by said electrodes, said rib and said door.

2. A storage device in accordance with claim 1, wherein said rib element is made of a flexible material.

3. A storage device as in claim 2, further comprising an insulation material disposed between said pair of electrodes so as to form an integral member comprising said electrodes and said insulation material.

4. A storage device having a storage space and an electric shock insect repeller, comprising, in combination:
    a door for closing and opening an opening of said storage space;
    at least a pair of electrodes to which a voltage is to be applied, said pair of electrodes defining therebetween an insulation space and being mounted to an inner face of said door so that when said door closes said opening of said storage space, said pair of electrodes are disposed peripherally of the closed opening of said storage space so as to surround the same; and
    a rib element disposed adjacent to said electrodes on said door and projecting from a plane of said electrodes, said rib abutting a vertical wall defining a periphery of said opening of said storage space whereby when said door is closed, a groove is defined peripherally of said opening by said electrodes, said rib and said vertical wall.

5. A storage device having a storage space and an electric shock insect repeller, comprising, in combination:
    a door for closing and opening an opening of said storage space;
    at least a pair of electrodes to which a voltage is to be applied, said pair of electrodes defining therebetween an insulation space, one electrode of said pair of electrodes being mounted on an inner face of said door relative to said storage space so that when said door closes said opening, said one electrode is deposed in surrounding relation to said opening, the other electrode of said pair being mounted on a vertical wall defining a periphery of said opening of said storage space so as to surround said opening of said storage space; and
    a rib element disposed adjacent to one of said electrodes and in surrounding relation to said opening inwardly of said one of said electrode relative to said opening of said storage space and projecting from a plane of said one of said electrodes.

* * * * *